United States Patent [19]

Lantz

[11] 4,305,207

[45] Dec. 15, 1981

[54] THREE-AXIS INSPECTION MACHINE

[76] Inventor: Dane A. Lantz, 2104 Davis Rd., Indianapolis, Ind. 46239

[21] Appl. No.: 81,012

[22] Filed: Oct. 1, 1979

[51] Int. Cl.³ .......................... G01B 7/03; G01B 7/31
[52] U.S. Cl. ................................. 33/174 L; 33/1 M; 33/174 Q
[58] Field of Search ............... 33/1 M, 169 R, 174 R, 33/174 L, 174 Q, 178 E, 185 R

[56] References Cited

U.S. PATENT DOCUMENTS

| | | | |
|---|---|---|---|
| 3,241,243 | 3/1966 | Speer | 33/174 L |
| 3,279,079 | 10/1966 | Schiler | 33/169 R |
| 3,438,133 | 4/1969 | Brault | 33/1 M |
| 3,823,482 | 7/1974 | Schiler | 33/169 R |
| 3,840,993 | 10/1974 | Shelton | 33/1 M |
| 3,840,994 | 10/1974 | Izumi et al. | 33/174 Q |
| 4,052,793 | 10/1977 | Coughlin et al. | 33/1M |
| 4,097,996 | 7/1978 | Yamazawa et al. | 33/1 M |
| 4,155,173 | 5/1979 | Sprandel | 33/1 M |

OTHER PUBLICATIONS

Coordinate Measuring Equipment Co., Inc., "Pacer", Jul. 1, 1977, 19 pages.

*Primary Examiner*—Richard R. Stearns
*Attorney, Agent, or Firm*—Woodard, Weikart, Emhardt & Naughton

[57] ABSTRACT

A three-axis coordinate inspection machine. A pair of parallel Z axis rails are mounted atop a bearing plate having an upwardly facing horizontal bearing surface. A single X axis rail has opposite ends slidably and bearingly mounted to the Z axis rail. The X axis rail extends through a carrier which is supported by the bearing surface of the bearing plate. A vertically extending column is mounted to the carrier and slidably holds in the vertical direction one or more inspection probes which may in turn be moved along the length of the X axis rail and Z axis rails.

12 Claims, 9 Drawing Figures

THREE-AXIS INSPECTION MACHINE

BACKGROUND OF THE INVENTION

This invention is in the field of machines used to inspect the alignment and location of various articles. Metal-working machines, including milling and similar machines, may be arranged in line with the workpiece moving past each machine in turn providing a specific machining operation upon the workpiece. Such an arrangement of machines is referred to as a transfer line. As the workpiece moves from one machine station to the next machine station of the transfer line, it is imperative that the individual machine stations be aligned and correctly located relative to the center fixture of the transfer line to insure achievement of the desired tolerances. The individual machine stations must be aligned when initially set up for operation. In addition, it is sometimes necessary to realign the work station after the transfer line has been used over a period of time. Currently with existing techniques, each individual machine station may be located and aligned in approximately eight to ten hours. By utilizing the device disclosed herein, it is possible to reduce the individual machine station alignment time to approximately two hours.

There are a number of devices which include inspection probes movable in the X, Y and Z axes. For example, the U.S. Pat. No. 3,279,079 issued to F. S. Schiler discloses an inspection probe mounted to a plurality of carriers allowing for a three-axis movement of the probe. Another approach to a three-axis inspection or measuring machine designed by F. S. Schiler is shown in U.S. Pat. No. 3,279,077. In lieu of moving the probe in all three axes, it is possible to move the probe in only two axes and instead move the workpiece in the third axis. Such an approach is shown in the U.S. Pat. No. 3,813,789 issued to Russell S. Shelton. The same Russell S. Shelton also discloses in his U.S. Pat. No. 3,840,993 a coordinate measuring machine having a probe which is movable in any of the three mutually perpendicular directions.

It can be appreciated that the alignment of one work station to another work station within a transfer line is extremely critical with a very small range of allowable error. For example, if a first work station is to provide a machining operation such as drilling a hole in a workpiece, and if the next work station is to provide another machining operation in the same hole, then it is imperative that the spindles of both machines be correctly aligned and located or else the workpiece will be improperly machined.

Typically, the prior coordinate measuring or inspection devices utilize a probe mounted to a first carrier vertically slidable upon a second carrier. The second carrier while slidable in, for example, the horizontal X direction, is in turn mounted to yet a third carrier which is horizontally slidable in the Z direction and eventually resting upon and supported by the bearing surface located upon the datum base of the transfer line center fixture. The margin of error is increased by such an approach utilizing three carriers sequentially slidable upon the adjacent carrier. The inspection machine disclosed herein mounts the vertical Y axis rail directly upon the horizontal bearing surface of the bearing plate in turn mounted to the center fixture of the transfer line. The vertical Y axis rail may be moved along both the Z and X horizontal axis rail but is independent thereof insofar as the Y axis rail is supported directly upon the horizontal bearing surface. The structure further allows the vertical Y axis rail and X axis rail to be lifted upwardly and removed from the bearing plate in a relatively easy manner thereby facilitating removal of the inspection machine from one location to another location.

In certain instances, the inspection of the location and alignment of the machine station by the heretofore available inspecting machines will indicate the spindle of the machine as correctly located when in fact the axis of rotation of the tool held by the spindle will be skewed. The machine disclosed herein includes a plurality of probes movable along the length of the tool held by the spindle thereby allowing comparison between the X and Y coordinates of one end of the tool as compared to the X and Y coordinates of the opposite end of the tool. In addition to the aforementioned advantages, the machine disclosed herein may be used to check not only individual work stations but also to check the dimensions of the actual workpiece produced by the transfer line.

SUMMARY OF THE INVENTION

One embodiment of the present invention is a three-axis inspection machine comprising a frame including a horizontal bearing surface, a carrier slidably mounted on, supported by and in contact with the bearing surface, X rail means mounted on the frame and defining an X axis, the X rail means engaged with the carrier and operable to guide the carrier atop the bearing surface slidably along the X axis, Z rail means mounted on the frame and defining a Z axis perpendicularly arranged to the X axis, the Z rail means engaged with the carrier and operable to guide the carrier atop the bearing surface slidably along the Z axis, a vertically extending Y column mounted to and slidable with the carrier atop the bearing surface along the X axis and Z axis and defining a Y axis perpendicularly arranged to the X axis and Z axis, the column supported by the bearing surface independently of the X rail means and Z rail means, and at least one probe slidably mounted to the Y column and movable along the Y axis as well as the X axis and Z axis into alignment with selected portions of an article to be inspected.

Another embodiment of the present invention is a multiple probe three-axis inspection machine comprising a frame including an X axis rail, a Y axis rail and a Z axis rail, a multiple probe holder slidably mounted to the frame and movable along the X axis rail, Y axis rail and Z axis rail to selected portions of an article to be inspected, and a plurality of probes mounted to the probe holder and arranged to simultaneously operatively engage selected portions of the article to be inspected.

Yet another embodiment of the present invention is an inspection machine movable in three axes comprising a bearing plate with a bearing surface, at least one Z axis rail and an X axis rail mounted to the plate and perpendicularly arranged to each other, a carrier slidably mounted to the plate and including a top saddle and a lower saddle removably secured together, the top saddle including bearing means supporting the carrier on the bearing surface, the X axis rail extending through the carrier with the top saddle straddling the X axis rail and with the Z axis rail located outwardly of the carrier, a Y axis rail mounted to and extending upwardly from the top saddle, a probe holder slidably mounted in a vertical direction to the Y axis rail, and a probe mounted to the holder to operatively engage the article to be inspected.

Yet a further embodiment of the present invention is a method of aligning the rotatable tool spindle of an individual machine relative to the datum base of a transfer line including the machine comprising the steps of mounting to the spindle a member with a longitudinal center axis extending in the direction of a Z axis, arranging a plurality of inspection probes to encircle the member when mounted, supporting the probes on a horizontally extending bearing surface atop the datum base, guiding the probes in X, Y and Z directions to a first position whereat the probes encircle a first portion of the member to be operatively engaged therewith, moving the probe along the center axis from the first position to a remote position associated with another portion of the member remote from the first portion, and moving the machine until the XY coordinate position of the member at the first portion relative to the datum base corresponds with the XY coordinate position of the member at the another portion as checked by the probes.

It is an object of the present invention to provide a new and improved coordinate measuring device usable with a transfer line and having probe movement in three perpendicular axes.

A further object of the present invention is to provide a coordinate measuring device wherein the inspecting probe is slidable on a vertical axis supported upon a horizontal bearing surface independently of the two perpendicularly arranged horizontal guide axes.

Yet another object of the present invention is to provide a three-axis inspection machine for checking skew of the axis of rotation of a machine spindle.

Related objects and advantages of the present invention will be apparent from the following description.

DESCRIPTION OF THE PREFERRED EMBODIMENT

Figure 1:
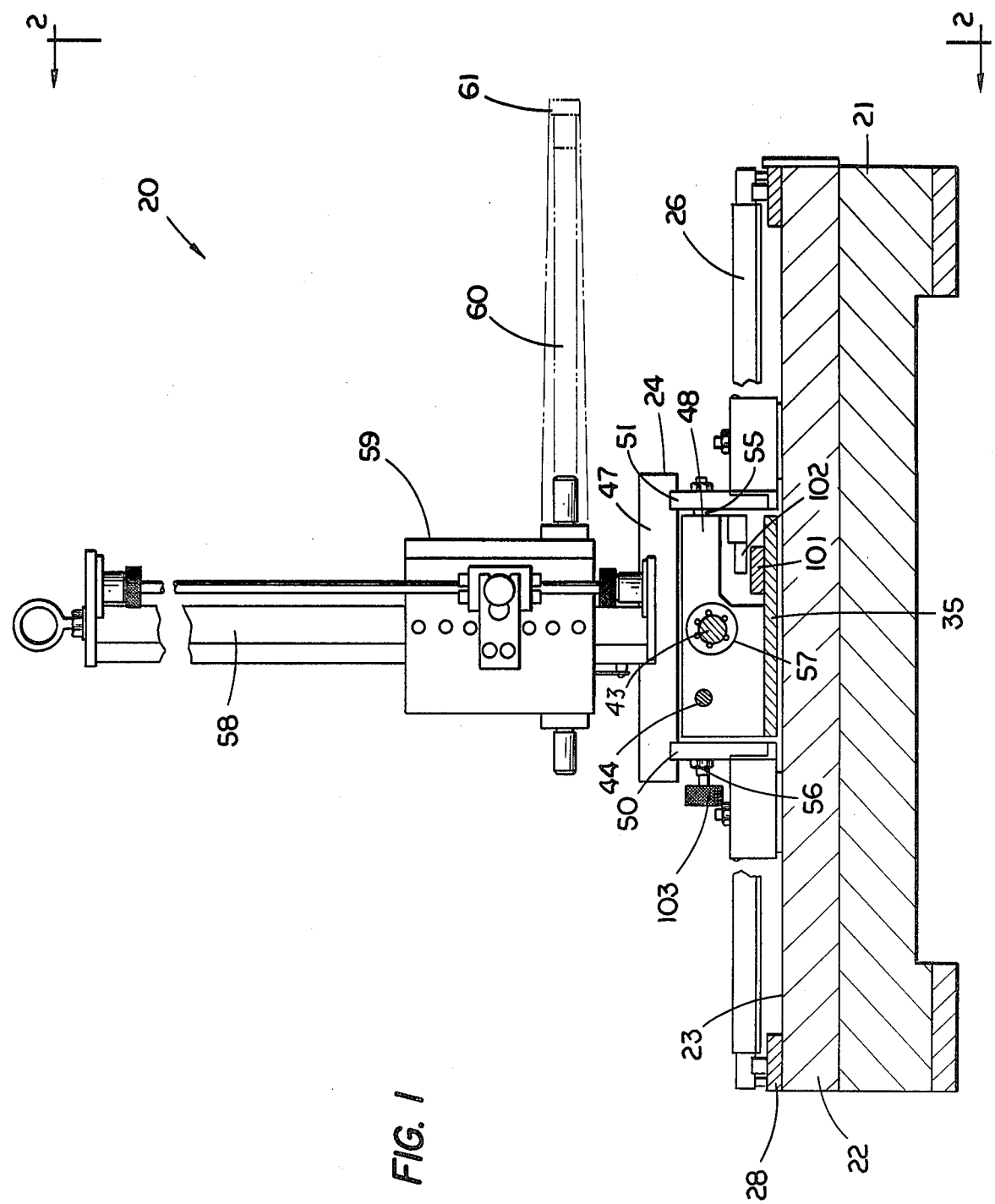
FIG. 1 is a cross-sectional view of the inspection machine taken along line 1—1 of FIG. 2 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
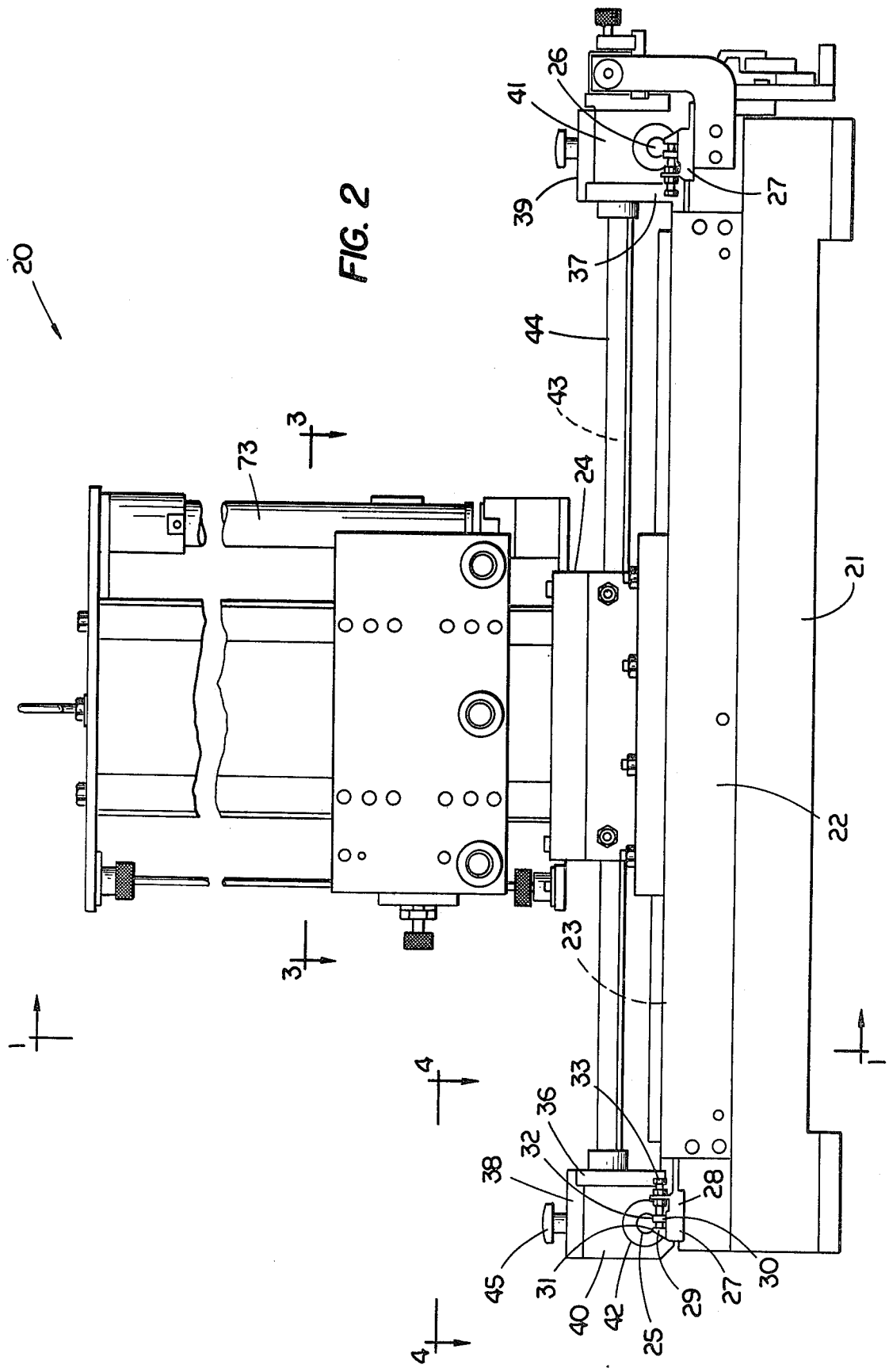
FIG. 2 is an end view of the inspection machine looking in the direction of arrows 2—2 of FIG. 1.

Referring now more particularly to FIGS. 1 and 2, there is shown a three-axis coordinate inspection machine 20. Machine 20 includes a pallet base 21 having a plurality of adjustable feet depending therefrom and which may be used to adjust the level of pallet base 21 relative to a datum base upon which the machine is positioned. A bearing plate 22 is fixedly mounted atop pallet base 21 and includes a horizontally extending and upwardly facing bearing surface 23. Probe carrier 24 is slidably mounted atop bearing plate 22 and is supported by and in contact with bearing surface 23. Carrier 24 is slidable in the X and Z directions and carries a vertical column allowing the probe to slide vertically in the Y direction.

A pair of rails 25 and 26 are mounted to bearing plate 22 with both rails being parallel and extending in the direction of and defining the Z axis. Each Z rail 25 and 26 has a pair of opposite ends supported by and mounted upon bearing plate 22 by mounting blocks 27. Each mounting block 27 has a main body 28 attached to bearing plate 22 with a pair of upwardly extending projections 29 and 30 in turn having mutually facing beveled surfaces 31 and 32 complementarily receiving the rounded outer surface of the Z rail. Projection 30 is attached to a threaded member 33 (FIG. 2) which may be moved to and from projection 29 thereby causing surfaces 31 and 32 to move together or further apart, thereby adjusting the vertical location of the Z rail. Likewise, mounting blocks 27 may be moved horizontally so as to adjust the horizontal location of the Z rail.

Figure 6:
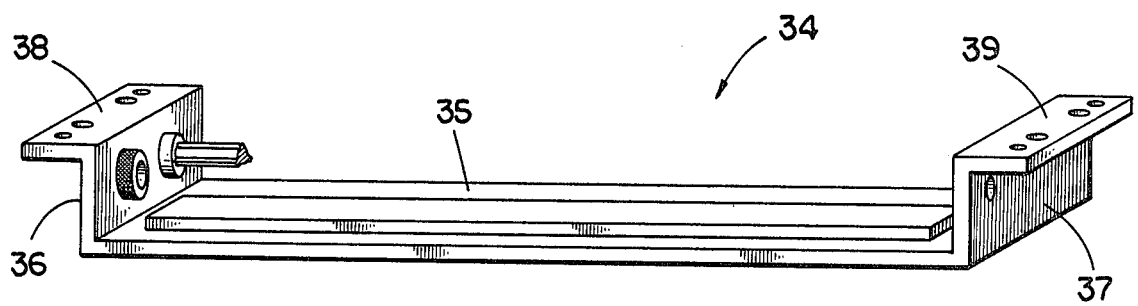
FIG. 6 is a perspective view of the main frame for supporting the X axis rail.

An X axis supporting frame 34 (FIG. 6) is mounted atop the bearing plate. Frame 34 includes a horizontally extending wall 35 fixedly attached to a pair of upwardly extending walls 36 and 37 in turn fixedly attached to a pair of outwardly extending flanges 38 and 39. Flanges 38 and 39 are removably mounted respectively to a pair of bearing housings 40 and 41 slidably mounted respectively to Z axis rails 25 and 26. Housings 40 and 41 each have conventional bearings 42 slidably engaging the Z axis rails to allow bearing housings 40 and 41 to be freely movable along the length of each rail 25 and 26. A single X axis rail 43 (FIG. 2) has opposite ends fixedly attached respectively to walls 36 and 37 of the X axis support frame 34. Thus, X axis rail 43 is movable along with its supporting frame 34 along the length of the Z axis rails 25 and 26. Wall 35 of the X axis supporting frame 34 (FIG. 1) is spaced apart from and above the horizontal bearing surface 23 of bearing plate 22. As a result, the X axis rail 43 along with the X axis supporting frame 34 is not in contact with the bearing plate 22 and is supported solely by the pair of Z axis rails.

Figure 4:
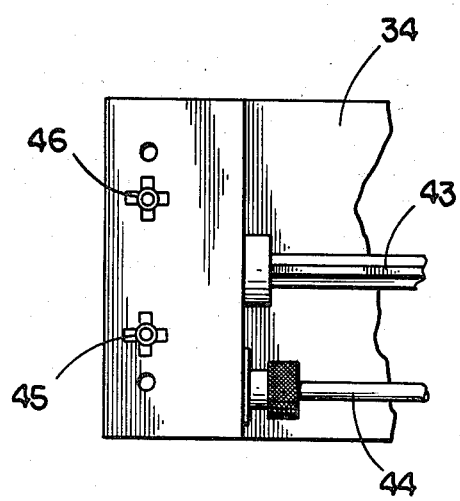
FIG. 4 is an enlarged fragmentary top view of the X axis rail looking in the direction of arrows 4—4 of FIG. 2.

In addition to the X axis rail 43, there is provided a fine feed rod 44 (FIG. 4) which likewise has its opposite ends mounted to the upwardly extending walls 36 and 37 of frame 34. The fine feed rod 44 (FIG. 4) is used to adjust carrier 24 along the length of the X axis rail 43 as will be described later in the specification. A pair of conventional fastening devices such as threaded members 45 and 46 are used to secure the outwardly extending flanges 38 and 39 respectively to bearing housings 40 and 41.

Figure 5:
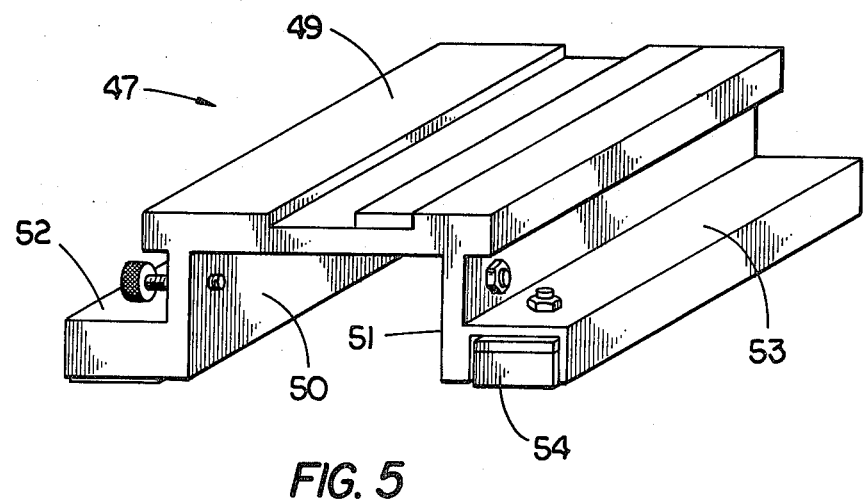
FIG. 5 is an enlarged perspective view of the upper saddle upon which the vertical Y column is mounted.

Carrier 24 includes an upper saddle 47 and lower saddle 48 (FIG. 1) removably secured together. Upper saddle 47 (FIG. 5) has a main body with a horizontally extending top wall 49 from which depends a pair of legs 50 and 51 in turn attached to outwardly extending flanges 52 and 53 having therein a plurality of bearings 54 to support the upper saddle atop of and in contact with bearing surface 23 of bearing plate 22. A variety of different types of bearings 54 may be used including the combination of conventional roller bearings and air bearings. Carrier 47 is positioned between the Z axis rails 25 and 26 and straddles the X axis rail 43.

The lower saddle 48 (FIG. 1) is positioned between the downwardly extending legs 50 and 51 of the upper saddle and is removably secured thereto by a stationary pin 55 and a rotatable release pin 56. Lower saddle 48 includes a conventional bearing 57 through which the X axis rail 43 extends. Likewise, the fine feed rod 44 extends through bearings mounted within the lower saddle 48. The lower saddle is spaced apart from wall 35 of the X axis supporting frame 34.

Fixedly mounted atop horizontal wall 49 of the top saddle 47 is a vertically extending Y axis rail 58 upon which a head assembly 59 is slidably mounted in the vertical direction. Attached to one side of head assembly 49 is a probe arm 60 with the actual probe being mounted to the outer distal end 61 of the probe arm 60. Thus, the probe may be moved in the vertical direction by sliding head assembly 59 vertically on the Y axis column 58 in turn slidable in the X axis direction along rail 43 and in the Z axis direction along Z axis rails 25 and 26. A conventional lifting bolt is mounted to the top end of column 58 to allow the column, head assembly 59 and carrier 24 to be lifted upwardly and removed from the bearing plate once the X axis supporting frame 34 is loosened from bearing blocks 40 and 41. Likewise, the column 58, head assembly 59 and top saddle 47 may be removed from the lower saddle 48 by loosening the upper saddle from the lower saddle by unloosening fastening devices 55 and 56.

Head assembly 59 (FIG. 3) includes a pair of spaced apart plates 62 and 63 secured together by a pair of end plates 64 and 65. A plurality of studs 66 through 71 are fastened to walls 62 and 63 to facilitate mounting of the probe arm 60. A plurality of bearings 72 are mounted interiorly to walls 62 and 63 and slidably engage column 58.

A conventional hollow cylinder 73 (FIG. 2) is fixedly mounted to the top and bottom of column 58 and slidably houses therein an air piston (not shown) which moves interiorly the length of tube 73. The piston not shown has a top surface and bottom surface to which the opposite ends of a line are attached with the line then extending exteriorly of the tube being connected to head assembly 59. Tube 73 is filled with compressed gas thereby maintaining appropriate pressures on the opposite sides of the air pistons to neutralize the weight of the head assembly as it is moved vertically along the length of column 58.

The two Z axis rails 25 and 26 are perpendicularly arranged to the X axis rail 43 with all three rails also being perpendicularly arranged to the Y axis rail or column 58. Column 58 is supported by the bearings of carrier 24 in contact with the horizontal bearing surface 23 of bearing plate 22. Head assembly 59 may therefore be moved vertically along column 58 which is not vertically supported by the three horizontal rails but instead is supported by the bearing plate 22. Further, the probe may be moved horizontally with carrier 24 along the length of the X axis rail 43 without being vertically supported by the three horizontal rails 25, 26 and 43 but being in fact supported by the horizontal top surface of the bearing plate. Likewise, the probe and carrier may be moved along the length of the two Z axis rails 25 and 26 being supported horizontally entirely by the bearing plate and not by the X axis rail 43. The probe mounted to the distal end of probe arm 60 may therefore be moved along any one of three perpendicularly arranged axes to be in alignment with selected portions of an article to be inspected.

Figure 7:
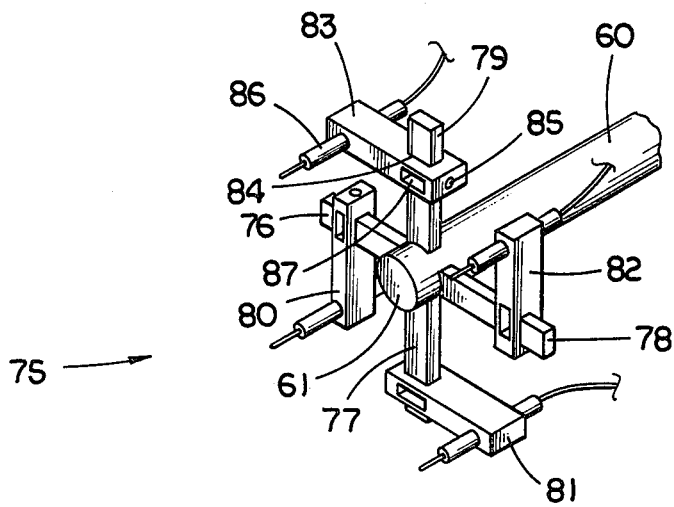
FIG. 7 is a fragmentary perspective view of the probe holder shown holding four separate probes oriented to simultaneously check a single flat surface.

A plurality of probes may be mounted to the head assembly 59 depending upon the particular surface or surfaces to be inspected. A multiple probe holder 75 is shown in FIG. 7 as removably secured to the distal end 61 of probe arm 60. Holder 75 includes four outwardly and radially extending arms 76 through 79 positioned at 90° intervals around the center axis of probe arm 60. Four elongated members 80—83 are removably mounted respectively to arms 76-79.

Member 83 will now be described, it being understood that a similar description applies to members 80—82. Member 83 includes a rectangular hole 84 through which arm 79 is extendable being secured therein by a conventional set screw or fastening device 85 projecting into hole 84 and abuttingly engaging arm 79. An electronic probe 86 is removably mounted to the distal end of member 83 and projects outwardly therefrom toward the surface to be inspected. A variety of different types of electronic probes 86 may be used. For example, a touch-trigger probe is available from Renishaw Electrical Ltd., Gloucester Street, Wotton-Under-Edge, Glos, England. This particular probe has been used for the last several years on many coordinate measuring machines throughout the world. The probe is a three-dimensional omnidirectional probe having approximately a 10 gram gauging force with a repeatability factor of 2.0 um. This type of probe basically provides an electronic output signal whenever the probe tip contacts the surface being inspected, thereby accurately locating or providing a reference for the location of the surface being inspected. As shown in the probe arrangement in FIG. 7, all four electronic probes extend in the same direction and are therefore arranged to simultaneously inspect a flat surface.

Figure 3:
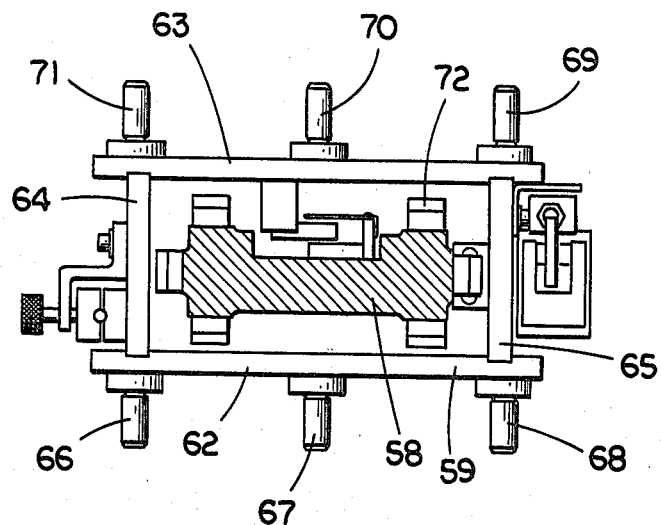
FIG. 3 is a cross-sectional view of the vertical column and probe head taken along line 3—3 of FIG. 2 and viewed in the direction of the arrows.
Figure 8:
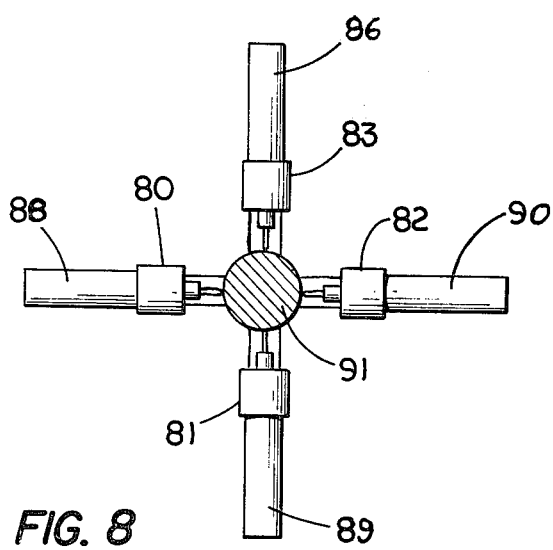
FIG. 8 is an end view of the probe holder shown in FIG. 7 only showing the four probes arranged in 90° intervals around the workpiece being inspected.

The exact same probe holder as shown in FIG. 7 is shown in FIG. 8 only with the probes arranged at 90° intervals around the article being inspected to accurately locate or provide a reference for the centerline of the article being inspected. FIG. 8 is an end view of the probe holder 75 with members 80-83 having been removed and reoriented to allow for the inwardly direction of the probes. Each probe has a second hole through which the probe arms 76 through 79 may extend. For example, member 83 has a second hole 87 arranged perpendicularly to hole 84. Set screw 85 is first loosened with member 83 then being removed from arm 79 and the arm 79 being inserted into hole 87 in such a manner that probe 86 is directed radially inward toward the axis of probe arm 60 and toward the opposite probe mounted to member 81. Likewise, elements 80-82 are removed and reoriented so that the four probes 88-90 are directed radially against the article 91 being inspected. The end of probe arm 60 opposite of the distal end 61 is secured to the head assembly by conventional fastening devices or studs 66-71 (FIG. 3). The probe arm has been removed from FIG. 3 for purposes of clarity.

Figure 9:
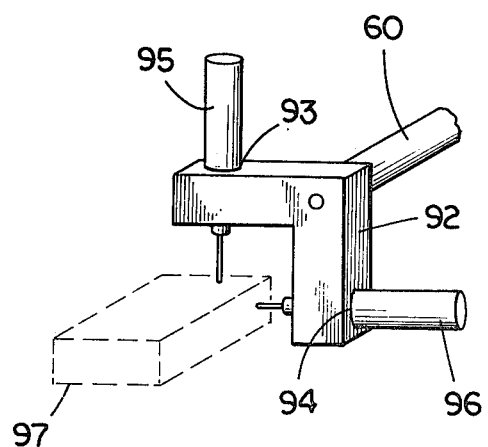
FIG. 9 is a perspective view of a probe holder for checking two perpendicularly arranged surfaces.

Another probe holder is shown in FIG. 9 having an L-shaped configuration for inspecting two perpendicularly arranged surfaces. Removably mounted by a conventional fastening means to the distal end of probe arm 60 is an L-shaped main frame 92 having a pair of perpendicularly arranged apertures 93 and 94 slidably and removably mounting a pair of probes 95 and 96 identical to the probes previously described. The article 97 being inspected has two perpendicularly arranged surfaces opposite the probe tips of probes 95 and 96 in order that the article being inspected be properly located or a reference position provided.

By using the aforementioned and described probe holders, it is possible to provide a plurality of probes slidably mounted to the vertical Y column which will also move along the X and Z axes into alignment with the portion of an article being inspected with each probe being operatively engaged by a separate portion of the article. All of the probes are arranged to be simultaneously engaged with the selected portions of the article being inspected.

The method of aligning the rotatable tool spindle of an individual machine of a transfer line relative to the datum base of the transfer line includes the first step of mounting a ground bar into the machine spindle. Typically, the ground bar is provided with a circular cross-sectional configuration and with a longitudinal centerline extending toward the inspection machine. A plurality of inspection probes may then be arranged to encircle the ground bar when the probes are moved toward the bar. In such case, the probe configuration shown in FIG. 8 would be utilized. The probes are then moved upwardly from the datum base on vertical column 58 and likewise moved along the X axis rail and Z axis rail until the probes encircle the distal end of the ground bar. Alternatively, the probes may be moved to the known predetermined location at which the ground bar should be located in the event the machine spindle is properly aligned. If the ground bar distal end is not at the particular predetermined location, then the machine spindle may be aligned until the ground bar is detected to be at the correct position as determined by the probes. In order to determine if the rotational axis or longitudinal centerline of the ground bar is skewed, the four probes may be moved along the length of the ground bar from the outer distal end of the ground bar toward the proximal end of the ground bar. The coordinate positions of the probes may then be compared from the position associated with the outer distal end to the position associated with the proximal end of the ground bar in order to determine if the ground bar is skewed. In the event the ground bar is skewed from the correct location, the machine spindle may be moved and aligned until the ground bar is correctly located. In such a case, the XY coordinate position for the ground bar at the distal end of the ground bar should be the same as the XY coordinate position of the proximal end of the ground bar. By supporting the probes atop a single horizontal bearing surface 23 of the bearing plate 22 while moving the probes both in the X and Z directions, the margin of error will be significantly reduced.

A variety of different configured probe arms 60 may be utilized and mounted to head assembly 59. For example, a straight or right-angle arm along with odd-angled or compound-angled arms may be utilized. In order to properly align a probe arm with the head assembly, each probe arm has a right-angle mounting block with two bushed mounting holes to receive two of the studs 66-71 (FIG. 3). At the distal end of the probe arm is provided a bushed mounting hole to receive the probe or indicator.

Each probe is basically an electrical switch with closed contacts in the null or armed position. A current of approximately 0.5 mA with open circuit voltage of 12-15 volts DC is used through the probe when connected to an electrical interface. A triggering resistance of approximately 10 kohms is used to insure reliable triggering in the event of fluctuations in contact resistance. Resistance of the probe does not exceed 1 k ohm and is typically less than 100 ohms.

A magnetic pickup system is used to measure the exact location of the probe along all three axes. The magnetic pickup system will now be described for indicating location along the X axis rail 43 with a similar description applying to measurement of the location of the probe along the Z axis rails 25 and 26 and the Y axis rail or column 58. An electric scale 101 (FIG. 1) is fixedly mounted to and along the length of wall 35 of the X axis supporting frame 34. A series of sine waves are provided on the top surface of electronic scale 101 positioned immediately beneath a scale slider 102 in turn fixedly mounted to the lower saddle 48. Electronic scale 101 and slider scale 102 are conventional in construction and are commercially available. Pickup scale 102 is connected to a readout device to indicate the position of slider 102 along the length of scale 101. Basically, slider 102 operates on a magnetic pickup operation and detects the particular portion of the sine wave impressed on scale 101 immediately beneath slider 102. A similar electronic scale and slider are provided respectively on the rear surface of the Y column 58 and a portion of head assembly 59 thereby detecting the particular location of the probe along the vertical axis. Similarly, an electronic scale and slider are provided respectively along the length of the Z axis rail 26 and the bearing housing 41. Nulling meters may be attached to the three scales to provide a zero or starting reference point. A suitable computer assist hardware is used in conjunction with the inspection machine shown in the drawing and may be of conventional design to provide automatic readout for the operator.

A fine feed rod is provided on each of the three axes to allow for minute movement of the probe along any one axis. For example, fine feed rod 44 has its opposite ends (FIG. 4) attached to the upwardly extending walls 36 and 37 (FIG. 6) of the X axis supporting frame 34. The fine feed rod 44 extends through the lower saddle 48 (FIG. 1) and is releasably engaged by a clamping fastener 103 (FIG. 1) which may take the form of a locking threaded member. Similar fine feed rods are provided on the Y column and the Z axis rails. Each fine feed rod is rotatably mounted with a knurled knob provided at each end of the rod. By rotating the knurled knob, the fine feed rod will rotate and cause the probe to slowly advance along the length of the rod. Each fine feed rod is bearingly received by the particular carrier or head assembly through which it extends but is not sufficiently gripped to preclude movement between the fine feed rod and carrier or head assembly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A three-axis inspection machine comprising:
a frame including a horizontal bearing surface;
a carrier slidably mounted directly on and supported by said bearing surface;
X rail means positioned adjacent said frame and defining an X axis, said X rail means engaged with said carrier and operable to guide said carrier atop said bearing surface slidably along said X axis;
Z rail means positioned adjacent said frame and defining a Z axis perpendicularly arranged to said X axis, said Z rail means operable to guide said carrier atop said bearing surface slidably along said Z axis;
a vertically extending Y column mounted to and slidable with said carrier atop said bearing surface along said X axis and Z axis and defining a Y axis perpendicularly arranged to said X axis and Z axis, said column supported by said bearing surface independently of said X rail means and Z rail means; and
at least one probe slidably mounted to said Y column and movable along said Y axis as well as said X axis and Z axis into alignment with selected portions of an article to be inspected.

2. The inspection machine of claim 1 and further comprising:
mounting means slidably mounted to said Z rail means and supporting said X rail means which extends through said carrier, said mounting means being operable to allow removal of said X rail means and said column from said frame.

3. The inspection machine of claim 1 and further comprising:
a second probe slidably mounted to said column to move along said Y axis, X axis and Z axis with said one probe and into alignment with a portion of an article to be inspected separate and apart from the portion of said article inspected with said one probe;
a holder slidably mounting said one probe and said second probe to said column.

4. The inspection machine of claim 3 and further comprising:
third and fourth probes mounted slidably to said column by said holder, each of said probes arranged at 90° intervals around the article to be inspected.

5. A multiple probe three-axis inspection machine comprising:
a frame including a horizontal bearing surface;
rail means including an X axis rail, a Y axis rail and a Z axis rail;
carrier means slidably mounted atop, on and contiguous with said bearing surface with said Y axis rail fixedly mounted to said carrier means and movable with said carrier means, said carrier means guided on said X axis rail and said Z axis rail;
a multiple probe holder slidably mounted to said Y axis rail;
a plurality of probes mounted to said probe holder and arranged to simultaneously engage selected portions of the article to be inspected; and wherein:
said probe holder mounts said probes at 90° intervals around the longitudinal centerline of the article to be inspected to operatively engage said article, said holder and probes are slidable along the length of said longitudinal centerline.

6. The inspection machine of claim 5 wherein:
said frame includes a horizontal bearing surface;
said probe holder is slidably mounted on and in contact with said bearing surface and is supported on said bearing surface independently of said X axis rail and Z axis rail.

7. A multiple probe three-axis inspection machine comprising:
a frame including a horizontal bearing surface;
rail means including an X axis rail, a Y axis rail and a Z axis rail;
carrier means slidably mounted atop, on and contiguous with said bearing surface with said Y axis rail fixedly mounted to said carrier means and movable with said carrier means, said carrier means guided on said X axis rail and said Z axis rail;
a multiple probe holder slidably mounted to said Y axis rail;
a plurality of probes mounted to said probe holder and arranged to simultaneously engage selected portions of the article to be inspected; and wherein:
said probe holder includes a plurality of probe receivers arranged to hold all of said probes in a single direction to simultaneously inspect a flat surface and further includes a plurality of alternate probe receivers arranged to hold said probes in 90° intervals around the article to be inspected.

8. A multiple probe three-axis inspection machine comprising:
a frame including a horizontal bearing surface;
rail means including an X axis rail, a Y axis rail and a Z axis rail;
carrier means slidably mounted atop, on and contiguous with said bearing surface with said Y axis rail fixedly mounted to said carrier means and movable with said carrier means, said carrier means guided on said X axis rail and said Z axis rail;
a multiple probe holder slidably mounted to said Y axis rail;
a plurality of probes mounted to said probe holder and arranged to simultaneously engage selected portions of the article to be inspected; and wherein:
said probe holder includes a first probe receiver holding one of said probes in a first direction and a second probe receiver holding another one of said probes in a second direction perpendicular to said first direction to simultaneously inspect two surfaces.

9. An inspection machine movable in three axes comprising:
a bearing plate with a bearing surface;
at least one Z axis rail mounted to said plate;
at least one X axis rail positioned on said plate and perpendicularly arranged to said Z axis rail;
a carrier slidably mounted to said plate and including a top saddle and a lower saddle removably secured together, said top saddle including bearing means supporting said carrier on said bearing surface, said X axis rail extending through said carrier with said top saddle straddling said X axis rail and with said Z axis rail located outwardly of said carrier;
a Y axis rail mounted to and extending upwardly from said top saddle;
a probe holder slidably mounted in a vertical direction to said Y axis rail.

10. The inspection machine of claim 9 and further comprising:
   a second Z axis rail with said carrier located between said one Z axis rail and said second Z axis rail; and
   a member extending between said lower saddle and said bearing plate with opposite end portions mounted adjacent said one Z axis rail and said second Z axis rail and with said X axis rail mounted to said end portions to allow removal of said X axis rail, lower saddle and member from said bearing plate once said Y axis rail and top saddle are removed therefrom.

11. A method of aligning the rotatable tool spindle of an individual machine relative to the datum base of a transfer line including the machine comprising the steps of:
   mounting to said spindle a member with a longitudinal center axis extending in the direction of a Z axis;
   arranging a plurality of inspection probes to encircle said member when mounted;
   supporting said probes on a horizontally extending bearing surface atop said datum base;
   guiding said probes in X, Y and Z directions to a first position whereat said probes encircle a first portion of said member to be operatively engaged therewith;
   moving said probe along said center axis from said first position to a remote position associated with another portion of said member remote from said first portion; and
   moving said machine until the XY coordinate position of said member at said first portion relative to said datum base corresponds with the XY coordinate position of said member at said another portion as checked by said probes.

12. The method of claim 11 wherein said supporting steps includes the substeps of:
   supporting said probes with bearing means in contact with said bearing surface and movable thereacross in the X direction; and
   supporting said probes with bearing means in contact with said bearing surface and movable thereacross in the Z direction.

* * * * *